(12) United States Patent
Ruckauer et al.

(10) Patent No.: US 10,977,550 B2
(45) Date of Patent: Apr. 13, 2021

(54) METHOD OF CONVERTING NEURAL NETWORK AND RECOGNITION APPARATUS USING THE SAME

(71) Applicants: SAMSUNG ELECTRONICS CO., LTD., Suwon-si (KR); UNIVERSITAET ZUERICH, Zurich (CH)

(72) Inventors: Bodo Ruckauer, Zurich (CH); Iulia-Alexandra Lungu, Zurich (CH); Yuhuang Hu, Zurich (CH); Michael Pfeiffer, Bern (CH)

(73) Assignees: SAMSUNG ELECTRONICS CO., LTD., Suwon-si (KR); UNIVERSITAET ZUERICH, Zurich (CH)

( * ) Notice: Subject to any disclaimer, the term of this patent is extended or adjusted under 35 U.S.C. 154(b) by 965 days.

(21) Appl. No.: 15/631,058

(22) Filed: Jun. 23, 2017

(65) Prior Publication Data
US 2018/0121802 A1    May 3, 2018

(30) Foreign Application Priority Data
Nov. 2, 2016 (KR) .......................... 10-2016-0145265

(51) Int. Cl.
*G06N 3/08*    (2006.01)
*G06N 3/04*    (2006.01)

(52) U.S. Cl.
CPC ................. *G06N 3/08* (2013.01); *G06N 3/04* (2013.01); *G06N 3/049* (2013.01)

(58) Field of Classification Search
CPC ............. G06N 3/08; G06N 3/04; G06N 3/049
See application file for complete search history.

(56) References Cited

U.S. PATENT DOCUMENTS

| 8,909,577 | B2 | 12/2014 | Heliot et al. |
| 8,990,132 | B2 | 3/2015 | Lo |
| 9,373,038 | B2 | 6/2016 | Richert et al. |
| 9,436,909 | B2 | 9/2016 | Piekniewski et al. |
| 2013/0151449 | A1* | 6/2013 | Ponulak ................. G06N 3/049 706/25 |
| 2013/0151450 | A1 | 6/2013 | Ponulak |
| 2014/0156577 | A1 | 6/2014 | Eliasmith et al. |
| 2014/0277718 | A1 | 9/2014 | Izhikevich et al. |

(Continued)

OTHER PUBLICATIONS

Caron, Louis-Charles, Michiel D'Haene, Frédéric Mailhot, Benjamin Schrauwen, and Jean Rouat. "Event management for large scale event-driven digital hardware spiking neural networks." Neural networks 45 (2013): 83-93. (Year: 2013).*

(Continued)

*Primary Examiner* — Luis A Sitiriche
*Assistant Examiner* — Casey R. Garner
(74) *Attorney, Agent, or Firm* — Sughrue Mion, PLLC (57) ABSTRACT

A neural network conversion method and a recognition apparatus that implements the method are provided. A method of converting an analog neural network (ANN) to a spiking neural network (SNN) normalizes first parameters of a trained ANN based on a reference activation that is set to be proximate to a maximum activation of artificial neurons included in the ANN, and determines second parameters of an SNN based on the normalized first parameters.

18 Claims, 7 Drawing Sheets

(56) References Cited

U.S. PATENT DOCUMENTS

| | | | |
|---|---|---|---|
| 2015/0134582 A1 | 5/2015 | Levin et al. | |
| 2015/0269482 A1 | 9/2015 | Annapureddy et al. | |
| 2015/0379397 A1 | 12/2015 | van der Made et al. | |
| 2016/0004960 A1 | 1/2016 | Saighi et al. | |
| 2016/0034812 A1 | 2/2016 | Gibson et al. | |
| 2017/0024661 A1* | 1/2017 | Hunsberger | G06N 20/00 |
| 2018/0075346 A1* | 3/2018 | Pantazi | G06N 3/049 |

OTHER PUBLICATIONS

Diehl et al., "Fast-Classifying, High-Accuracy Spiking Deep Networks Through Weight and Threshold Balancing", 2015, International Joint Conference on Neural Networks (IJCNN), IEEE, pp. 1-8.

Cao et al., "Spiking Deep Convolutional Neural Networks for Energy-Efficient Object Recognition", International Journal of Computer Vision, 2015, vol. 113, pp. 54-66.

Esser et al., "Convolutional Networks for Fast, Energy-Efficient Neuromorphic Computing", arXiv:1603.08270v1, [cs.NE], Mar. 28, 2016, Proceedings of the National Academy of Sciences, pp. 1-7.

Hunsberger et al., "Spiking Deep Networks with LIF Neurons", arXiv:1510.08829v1 [cs.LG], Oct. 29, 2015, pp. 1-9.

Perez-Carrasco et al., "Mapping from Frame-Driven to Frame-Free Event-Driven Vision Systems by Low-Rate Rate-Coding and Coincidence Processing. Application to Feed-Forward ConvNets", IEEE Transactions on Pattern Analysis and Machine Intelligence, Nov. 2013, pp. 1-20.

Ioffe et al., "Batch Normalization: Accelerating Deep Network Training by Reducing Internal Covariate Shift", arXiv:1502.03167v3 [cs.LG], Mar. 2, 2015, pp. 1-11.

Lee et al., "Training Deep Spiking Neural Networks Using Backpropagation", Frontiers in Neuroscience, Nov. 8, 2016, vol. 10, Article 508, pp. 1-13.

Nessler et al., "STDP enables spiking neurons to detect hidden causes of their inputs", Advances in Neural Information Processing Systems 22 (NIPS 2009), pp. 1-9.

Rueckauer et al., "Theory and Methods for improved Conversion of Analog to Spiking Neural Networks", 29th Conference on Neural Information Processing Systems (NIPS 2016), Barcelona, Spain, pp. 1-19.

* cited by examiner

METHOD OF CONVERTING NEURAL NETWORK AND RECOGNITION APPARATUS USING THE SAME

CROSS-REFERENCE TO RELATED APPLICATION

This application claims priority from Korean Patent Application No. 10-2016-0145265, filed on Nov. 2, 2016 in the Korean Intellectual Property Office, the disclosure of which is incorporated herein by reference in its entirety.

BACKGROUND

1. Field

Methods and apparatuses consistent with exemplary embodiments relate to a method of converting a neural network and a recognition apparatus using the same.

2. Description of the Related Art

To solve a complex or unsolved problem, studies for applying a recognition method of a human to a device have been conducted. One of the studies is based on a neural network that models human biological neurons. The neural network uses an algorithm that simulates a learning ability of a human. The neural network may perform mapping between an input pattern and output patterns that result from learning. Further, the neural network may have a generalization ability to generate a relatively correct output with respect to an input pattern yet to be used for learning based on a learning result.

SUMMARY

Exemplary embodiments may address at least the above problems and/or disadvantages and other disadvantages not described above. Also, the exemplary embodiments are not required to overcome the disadvantages described above, and an exemplary embodiment may not overcome any of the problems described above.

According to an aspect of an exemplary embodiment, there is provided a method for converting an analog neural network (ANN) to a spiking neural network (SNN), the method including normalizing first parameters of a trained ANN based on a reference activation that is determined based on a predetermined proximity with respect to a maximum activation of artificial neurons included in the ANN, and determining second parameters of an SNN based on the normalized first parameters.

The normalizing may include setting an activation to be proximate to a one-hundredth (100-th) percentile from among activations of the artificial neurons included in the ANN as the reference activation, and normalizing the first parameters based on the reference activation.

The normalizing may include determining a reference activation that corresponds to a first layer included in the ANN, and normalizing first parameters that correspond to the first layer based on the determined reference activation, and the reference activation that corresponds to the first layer may be set to be more proximate to the maximum activation than a reference activation that corresponds to a second layer that is subsequent to the first layer.

A current membrane potential of an artificial neuron included in the SNN may be determined based on at least one from among a previous membrane potential of the artificial neuron, a reception signal received via an input synapse of the artificial neuron, and a predetermined bias.

An output layer included in the SNN may determine an artificial neuron to be used for outputting a spike based on current membrane potentials of artificial neurons included in the output layer obtained at a predetermined timing, and output the spike via the determined artificial neuron.

A threshold that relates to outputting a spike may not be set for the artificial neurons included in the output layer.

A pooling layer included in the SNN may transmit, to a layer subsequent to the pooling layer, a spike received from an artificial neuron having a greatest firing rate from among a plurality of artificial neurons included in a layer previous to the pooling layer.

For each respective artificial neuron, a corresponding firing rate may be determined by performing at least one from among estimating a membrane potential of the corresponding artificial neuron that increases when a reception signal is received via an input synapse and decreases exponentially over time, counting spikes output from the corresponding artificial neuron within a predetermined time window, counting accumulated spikes output from the corresponding artificial neuron, and measuring a time interval between spikes output from the corresponding artificial neuron.

A current membrane potential of an artificial neuron included in the SNN may decrease by a predetermined threshold when a spike is output from the artificial neuron as the current membrane potential exceeds the predetermined threshold.

The normalizing may include normalizing the first parameters that correspond to a first layer included in the ANN based on an average and a variance of an input signal input into the first layer such that the input signal is normalized.

An input layer included in the SNN may determine membrane potentials of artificial neurons included in the input layer from analog input data to be recognized by using the SNN, determine whether a new spike is generated and an artificial neuron to be used for outputting the new spike based on the determined membrane potentials and a predetermined threshold, and output the new spike via the determined artificial neuron.

The first parameters may include weights assigned to synapses of a plurality of neurons that belong to the ANN and biases applied to the plurality of neurons.

According to another aspect of an exemplary embodiment, there is also provided a recognition apparatus including a processor configured to recognize input data by using an SNN, and a memory including at least one instruction that is executable by the processor. An output layer included in the SNN may be configured to determine an artificial neuron to be used for outputting a spike based on current membrane potentials of artificial neurons included in the output layer obtained at a predetermined timing, and to output the spike via the determined artificial neuron.

BRIEF DESCRIPTION OF THE DRAWINGS

The above and/or other aspects will be more apparent by describing certain exemplary embodiments with reference to the accompanying drawings, in which.

DETAILED DESCRIPTION

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In addition, the terms such as "unit", "-er (-or)", and "module" as described in the specification refer to an element for performing at least one function or operation, and may be implemented in hardware, software, or a combination of hardware and software.

In the following description, like drawing reference numerals are used for like elements, even in different drawings. Various alterations and modifications may be made to the exemplary embodiments, some of which will be illustrated in detail in the drawings and detailed description. The matters defined in the description, such as detailed construction and elements, are provided to assist in a comprehensive understanding of the exemplary embodiments. However, it should be understood that these exemplary embodiments are not construed as limited to the illustrated forms and include all changes, equivalents or alternatives within the idea and the technical scope of this disclosure. It is apparent that the exemplary embodiments can be practiced without those specifically defined matters. Also, well-known functions or constructions are not described in detail since they would obscure the description with unnecessary detail.

Exemplary embodiments set forth hereinafter may be used to configure a spiking neural network (SNN) from an analog neural network (ANN) or to recognize input data by using the configured SNN. The exemplary embodiments may be implemented as any of various types of products, such as, for example, a personal computer, a laptop computer, a tablet computer, a smart phone, a television, a smart home appliance, an intelligent vehicle, a kiosk, and a wearable device. Hereinafter, the exemplary embodiments will be described in detail with reference to the accompanying drawings, wherein like drawing reference numerals are used for like elements.

Figure 1:
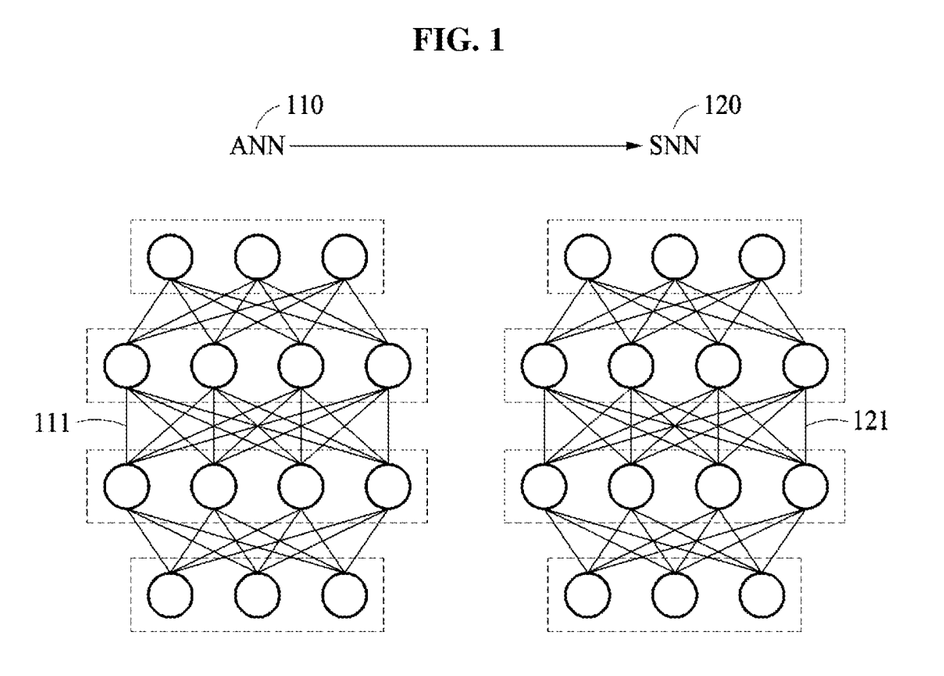
FIG. 1 is a diagram illustrating a process of converting an analog neural network (ANN) to a spiking neural network (SNN), according to an exemplary embodiment.

FIG. 1 is a diagram illustrating a process of converting an ANN to an SNN, according to an exemplary embodiment.

Referring to FIG. 1, an ANN 110 and an SNN 120 are illustrated.

The ANN 110 is a deep neural network that includes a plurality of hidden layers, and may include, for example, a convolutional neural network (CNN).

The ANN 110 may include a plurality of layers, and each of the layers may include a plurality of neurons. Neurons of neighboring layers may be connected by synapses. Weights may be assigned to the synapses via training, and first parameters 111 may include the weights. In addition, the first parameters 111 may further include biases applied to the plurality of neurons. The biases will be described further below.

The SNN 120 may be a neural network that integrates a concept of time with states of neurons and synapses and an operating model thereof. The SNN 120 may be based on a concept that a neuron fires or "spikes" when a state, such as, for example, a membrane potential, of the neuron reaches a predetermined threshold, and a firing or spiking time is significant with respect to a function of a neuron. When a neuron fires, the neuron may generate a spike that moves to other neurons. A spike that moves to another neuron may influence states of other neurons based on a time at which the spike is received.

In this aspect, the SNN 120 is a neural network that operates based on an event. When compared to the ANN 110, the SNN 120 may have a relatively low computational complexity for deducing an answer, reduce a latency until a calculated output is available, process inputs from event-based sensors such as dynamic vision sensors, and be data-driven, and thus may prevent performing of unnecessary operations in a case in which an input is absent in an "always-on" scenario.

However, it is difficult to train the SNN 120 in reality due to a singularity of the operation. Conversely, there have been many studies conducted in relation to the ANN 110, and the studies have introduced many schemes of improving the performance of the ANN 110.

Thus, by determining second parameters 121 of the SNN 120 by using the first parameters 111 of the ANN 110 which has been trained to have a high performance, the SNN 120 may be trained indirectly and the recognition accuracy of the SNN 120 may improve.

A conversion from the ANN 110 to the SNN 120 is performed based on matching between an activation of an artificial neuron in the ANN 110 and a firing rate of the SNN 120. For the conversion, a classification error of the SNN 120 that exhibits the same performance as the ANN 110 and a correlation between the ANN 110 and the SNN 120 must be considered.

Figure 2:
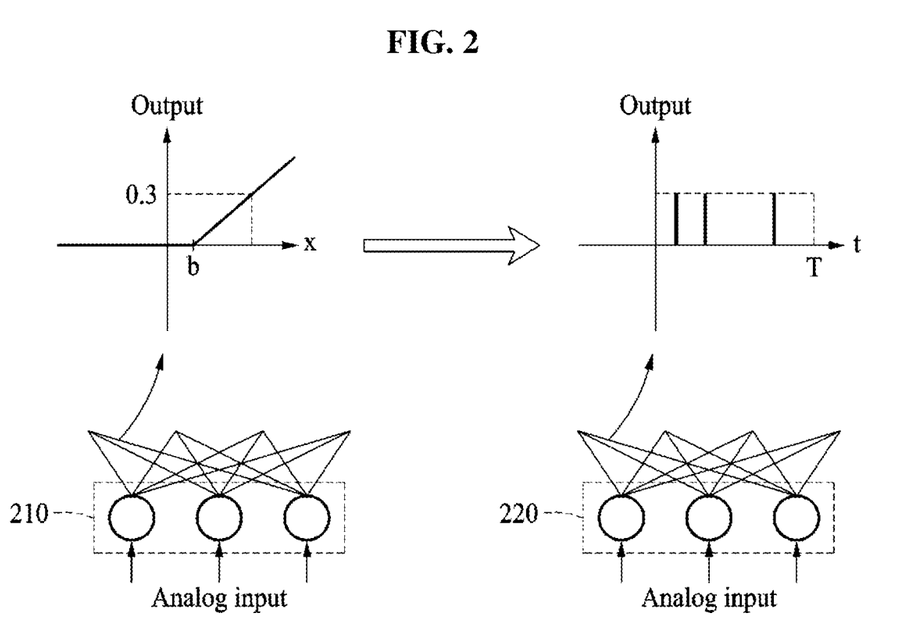
FIG. 2 is a diagram illustrating a process of matching an activation of an ANN with a firing rate of an SNN, according to an exemplary embodiment.

FIG. 2 is a diagram illustrating a process of matching an activation of an ANN with a firing rate of an SNN, according to an exemplary embodiment.

Referring to FIG. 2, an input layer 210 of an ANN and an input layer 220 of an SNN are illustrated. In advance of describing an operation of the input layers 210 and 220, an operation of artificial neurons included in the input layers 210 and 220 will be described below.

<Biases Applied to Artificial Neurons>

An ANN-to-SNN conversion may be performed by matching activations of artificial neurons included in the ANN with firing rates of artificial neurons included in the SNN. In the ANN, the activations of the artificial neurons are time-independent, and may be expressed by Equation 1.

$$a_i^l = \max\left(0, \sum_{j=1}^{M^{l-1}} W_{ij}^l a_j^{l-1} + b_i^l\right) \quad \text{[Equation 1]}$$

In Equation 1, $M^{l-1}$ denotes a number of artificial neurons in a layer l-1 NV denotes a weight that connects the layer l-1 to a layer l, and $b^l$ denotes a bias set for an artificial neuron. $a^0=x$ denotes an input that assumes, for example, gray levels or RGB values are normalized within a range [0, 1].

In the SNN, a driving operation may be divided into time steps dt $\in \mathbb{N}$, and an input signal may be assumed as being suggested in $T \in \mathbb{N}$ time steps. An artificial neuron in the layer l has a membrane potential $V_i^l(t) \in \mathbb{R}^+$ which is determined based on a time-varying input signal $z_i^l(t)$. In a case in which a current membrane potential $V_i^l(t)$ is increased to be greater than a threshold $\tau \in \mathbb{R}^+$ by the input signal $z_i^l(t)$, the membrane potential may be reset and a spike may be generated. A step-function to simplify a notation may be used as expressed by Equation 2.

$$\Theta_{t,i}^l := \Theta(V_i^l(t-1) + z_i^l(t) - \tau) = \begin{cases} 1 & \text{if } V_i^l(t-1) + z_i^l(t) \geq \tau \\ 0 & \text{else} \end{cases} \quad \text{[Equation 2]}$$

In Equation 2, in a case in which a sum of the input signal $z_i^l(t)$ and a previous membrane potential $V_i^l(t-1)$ is greater than or equal to a threshold, a value of the step-function may be equal to one (i.e., "1"), and a spike may be generated at a corresponding artificial neuron. Conversely, in a case in which the sum of the input signal $z_i^l(t)$ and the previous membrane potential $V_i^l(t-1)$ is less than the threshold, the value of the step-function may be equal to zero (i.e., "0"). A total number of spikes $N_i^l \in \mathbb{N}$ emitted at the artificial neuron i in the layer l during a simulation time T using the step-function $\Theta$ may be expressed by Equation 3.

$$N_i^l(T) := \sum_{t=1}^{T} \Theta_{t,i}^l \quad \text{[Equation 3]}$$

By using the above-described equations, an average firing rate $$r_i^l(T) = \frac{N_i^l(T)}{T}$$

may be defined, and an activation $\alpha_i^l$ and the average firing rate $r_i^l(T)$ in the ANN may be matched.

Unlike the ANN, in the SNN, an input from a neuron j in the layer l-1 into a neuron i in the layer l may be decoupled from previous inputs by a spike generation mechanism. A total input signal in the SNN may be expressed by Equation 4.

$$z_i^l(t) = \tau \left( \sum_{j=1}^{M^{l-1}} W_{ij}^l \Theta_{t,j}^{l-1} + b_i^l \right) \quad \text{[Equation 4]}$$

In Equation 4, $b_i^l$ denotes a bias of an artificial neuron. Since a threshold $\tau$ globally scales firing rates in the SNN, the threshold $\tau$ may be included in Equation 4 together with the step-function $\Theta$, and may re-scale the bias. In order to know the reason, a case in which there is no input signal transmitted from a previous layer, and an activation is performed only from biases, may be considered. In this example, the membrane potential may be increased by the biases as a time-step increases, and the membrane potential $V_i^l(t)$ may reach the threshold for the first time after a time step t1 (for example, $V_i^l(t_1) = \tau \leq t_1 b_i^l, \text{SNN}$).

For ease of description, it is assumed that $t_1 b_i^l, \text{SNN}$ exactly reaches the threshold $\tau$. A more general case will be described below in detail when discussing a reset by subtraction mechanism. The firing rate may be given by $r_i^l = 1/t_1 = b_{i,\text{SNN}}^l / \tau$. An activation $\alpha_i^l$ of the ANN to be matched in a case of a zero input may decrease to the bias $\alpha_i^l = b_{,\text{ANN}}^l$. In the above description, $\alpha_i^l = b_{i,\text{ANN}}^l \doteq b_{i,\text{SNN}}^l / \tau = r_i^l$ may be satisfied when the biases in the SNN are multiplied by the threshold $\tau$.

The notation may be simplified by assuming a unit threshold, for example, $\tau = 1$. Scaling by the threshold may be applied only to second parameters of the SNN.

The biases in the SNN may be simply implemented by applying a constant input current to a membrane potential of each artificial neuron.

Depending on a sign of the bias (i.e., based on whether the bias is positive or negative), adding a constant current to an artificial neuron of the SNN may cause a non-zero firing rate although a zero or negative input is present, or shift an onset of spiking such that larger positive inputs are required to drive the artificial neuron. In particular, a bias b may shift a transfer function $f(y) = \max(0, y)$ such as a rectified linear unit (ReLU) of the artificial neuron to $f(y+b) = \max(0, y+b)$ along an input axis.

The biases may be implemented by injecting constant currents that are proportional to the biases of the artificial neurons included in the ANN.

<Membrane Potential and Reset Mechanism>

A membrane equation of an artificial neuron included in the SNN may show how a membrane potential changes in response to a received or generated spike. A membrane potential $V_i^l(t) \in \mathbb{R}^+$ of a neuron i in a layer l may change in response to an input signal $z_i^l(t)$ a time t. In a case in which a current membrane potential $V_i^l(t)$ is increased to be greater than a threshold $\tau \in \mathbb{R}^+$ by the input signal $z_i^l(t)$, the membrane potential may be reset and a spike may be generated.

A reset by subtraction mechanism may subtract the threshold $\tau$ from the current membrane potential when a spike is generated as the current membrane potential exceeds the threshold, which may be expressed by Equation 5.

$$V_i^l(t) = V_i^l(t-1) + z_i^l(t) - \tau \Theta(V_i^l(t-1) + z_i^l(t) - \tau) \quad \text{[Equation 5]}$$

<Analog Input>

The SNN is suitable for processing event-based inputs from dynamic vision sensors. However, event-based data sets for training the SNN are restricted. Thus, when a first layer included in the SNN receives an analog input signal and calculates a spike from the analog input signal, the availability of the SNN may improve. In this aspect, analog input signals may be input into an input layer of the SNN, and the input layer may perform an event-based operation.

An input signal to be transmitted to a first hidden layer in response to an analog input signal $x_j$ may be expressed by Equation 6.

$$z_i^1(t) = \tau \left( \sum_{j=1}^{M^0} W_{ij}^1 x_j + b_i^1 \right) \quad \text{[Equation 6]}$$

When combining Equation 6 with Equation 1, a relation between an activation in the first hidden layer and an input signal of the SNN may be expressed by Equation 7.

$$\frac{z_i^1}{\tau} = \sum_{j=1}^{M^0} W_{ij}^1 x_j + b_i^1 = \max\left(0, \sum_{j=1}^{M^0} W_{ij}^1 x_j + b_i^1\right) = a_i^1 \quad \text{[Equation 7]}$$

In Equation 7, when it is assumed that an input signal z is positive, the input signal z may be inserted into a ReLU activation function. In a case of z≤0, no spike may be fired. Further, a corresponding activation of the ANN may be zero due to the ReLU activation function. In this example, there may exist a perfect match between a firing rate of the SNN and an activation of the ANN. Thus, in the following example, z≥0 is always assumed.

<Firing Rate>

A special case l=1 that assumes a constant input into the first hidden layer is analyzed. In this example, the membrane potential of Equation 5 during the simulation time T may be expressed using Equation 3, as given by Equation 8.

$$\sum_{t=1}^{T} V(t) = \sum_{t=1}^{T} V(t-1) + \frac{T}{dt}z - \tau N \quad \text{[Equation 8]}$$

When Equation 8 is solved with respect to N and divided by T to obtain r, it may be expressed by Equation 9.

$$r(T) := \quad \text{[Equation 9]}$$
$$\frac{N}{T} = \frac{z}{\tau dt} - \frac{1}{\tau T}\sum_{t=1}^{T}(V(t) - V(t-1)) = \frac{z}{\tau dt} - \frac{V(T) - V(0)}{\tau T}$$

When progressing to the last step of Equation 9, sigma may be simplified by cancelling out remaining terms excluding t∈{1,T}. Thus, an average firing rate of artificial neurons included in the first hidden layer of the SNN that corresponds to the activation of the ANN as expressed in Equation 8 may be reduced by an error term that disappears when the simulation time T increases. Such an error is a simple artifact of estimating the firing rate by sampling discrete spikes from the membrane potential.

<Variation of Average Firing Rate>

Except for predicting a firing rate, fluctuations of the firing rate predicted with respect to a target value and how the fluctuations change over time will be described.

The above issue may be approached by expending a total number of spikes N(T) after the simulation time T.

$$r(T) = \frac{N(T)}{T} = \frac{N(T-1) + \delta_{TT^*}}{T} \quad \text{[Equation 10]}$$

In Equation 10, T* denotes a time of a spike. If a spike is present at the last time step T, the Kronecker delta δ may be given as "1". Equation 10 may be rearranged as expressed by Equation 11.

$$r(T) = \frac{N(T-1)}{T-1}\frac{T-1}{T} + \frac{\delta_{TT^*}}{T} = r(T-1)\left(1 - \frac{1}{T}\right) + \frac{\delta_{TT^*}}{T} \quad \text{[Equation 11]}$$

Then, a relative fluctuation may be expressed by Equation 12.

$$|r(T) - r(T-1)| = \frac{|\delta_{TT^*} - r(T-1)|}{T} \leq \frac{1}{T} \quad \text{[Equation 12]}$$

When the simulation time T increases, the relative fluctuation may converge to zero by a factor of 1/T. For example, if 100 time steps elapse, the relative fluctuation may be below 1%.

<Reset by Subtraction Mechanism>

When a spike is generated by an artificial neuron, a membrane potential may decrease by a threshold, rather than being reset to zero. Thus, the membrane potential may no longer have a boundary. If Z>τ, the membrane potential may increase indefinitely. First, a case in which z≤τ may be considered. Further, the membrane potential V may be limited by the threshold, and a time-dependent second term of Equation 9 may disappear as expressed by Equation 13, when expressed in the form of a limit.

$$\lim_{T \to \infty} r_{z \leq \tau}(T) = \frac{z}{\tau dt} - \lim_{T \to \infty}\left(\frac{V(T) - V(0)}{\tau T}\right) = \frac{z}{\tau dt} = \frac{a}{dt} \quad \text{[Equation 13]}$$

According to Equation 13, the firing rate of the first hidden layer may converge to a product of the activation of the ANN and a maximum firing rate 1/dt, which is reasonable in a case of an activation that is smaller than a unity (i.e., one).

Conversely, in a case in which z>τ, there may be N=T/dt spikes, and thus it may be expressed by $$V(T) = \frac{T}{dt}z - N\tau = \frac{T}{dt}(z - \tau).$$

Then, it may be expressed by Equation 14.

$$\lim_{T \to \infty} r_{z > \tau}(T) = \frac{1}{dt} + \lim_{T \to \infty}\frac{V(0)}{\tau T} = \frac{1}{dt} \quad \text{[Equation 14]}$$

According to Equation 14, the maximum firing rate 1/dt may be deduced. Further, this implies that an asymptotic firing rate may never reach the activation α=z/τ the ANN.

<Firing Rates in Higher Layers>

In a reset by subtraction mechanism, propagation of an approximation error in a neural network will be described. For this, Equation 5 for l>1 may be iteratively solved with respect to Equation 4, as expressed by Equation 15.

$$V_i^l(t) = V_i^l(t-1) + \tau\left(\sum_{j=1}^{M^{l-1}} W_{ij}^l \Theta_{t,j}^{l-1} + b_i^l\right) - \tau\Theta_{i,t}^l \quad \text{[Equation 15]}$$

Equation 15 may be added to the whole simulation time T and arranged as expressed by Equation 16.

$$0 = -\sum_{t=1}^{T}(V_i^l(t) - V_i^l(t-1)) + \tau \sum_{j=1}^{M^{l-1}} W_{ij}^l \sum_{t=1}^{T} \Theta_{t,j}^{l-1} +$$

$$\tau \sum_{t=1}^{T} b_i^l - \tau \sum_{t=1}^{T} \Theta_{i,t}^l$$

$$= -(V_i^l(T) - V_i^l(0)) + \tau \sum_{j=1}^{M^{l-1}} W_{ij}^l N_j^{l-1} + \tau \frac{T}{dt} b_i^l - \tau N_i^l.$$

[Equation 16]

When dividing both sides by T and arranging it with a spike rate r=N/T, it may be expressed as given by Equation 17.

$$r_i^l(T) = \sum_{j=1}^{M^{l-1}} W_{ij}^l r_j^{l-1}(T) + \frac{b_i^l}{dt} - \frac{V_i^l(T) - V_i^l(0)}{\tau T}$$

[Equation 17]

A firing rate of an artificial neuron in a layer d may be determined to be a weighted sum of activities of a previous layer. However, a time-decaying approximation error that also appears in the first layer may be negative. This implies approximation errors of previous layers are propagated through a neural network, and multiplied by a weight of a next higher layer.

By substituting Equation 9 for Equation 17, a firing rate of a second layer may be calculated as expressed by Equation 18.

$$r_i^2 = \sum_{j=1}^{M^1} W_{ij}^2 \frac{z_j^1}{\tau dt} + \frac{b_i^2}{dt} -$$

$$\sum_{j=1}^{M^1} W_{ij}^2 \frac{V_j^1(T) - V_j^1(0)}{\tau T} - \frac{V_i^2(T) - V_i^2(0)}{\tau T}$$

[Equation 18]

In Equation 18, the first and second terms correspond to activations of an artificial neuron i of the second layer. The third term is an approximation error of the first layer weighted by a weight $W_{ij}^2$ projected into the second layer. The last term is a time-dependent approximation error of a current layer. A general form with respect to arbitrary hidden layers s may be expressed by Equation 19.

$$r_i^l = \frac{a_i^l}{dt} - \Delta V_{i_l}^l - \sum_{i_{l-1}=1}^{M^{l-1}} W_{i_l i_{l-1}}^l \Delta V_{i_{l-1}}^{l-1} - \ldots -$$

$$\sum_{i_{l-1}=1}^{M^{l-1}} W_{i_l i_{l-1}}^l \ldots \sum_{i_1=1}^{M^1} W_{i_2 i_1}^2 \Delta V_{i_1}^1$$

[Equation 19]

In Equation 19, $\Delta V_i^l := (V_i^l(T) - V_i^l(0))/(\tau T)$. In particular, a neuron i in a layer l may receive an input spike train with a slightly lower spike rate which is reduced based on a sampling error $\Delta V$ of neurons included in a previous layer. Such errors may be accumulated in higher layers.

<Training with Noise Injection>

Sampling errors from a spike generation mechanism may result from deviations between activations of the ANN and firing rates of the SNN. Further, artificial neurons in higher layers that receive inputs in a form of spike trains may always exhibit greater deviations from a target rate than artificial neurons that receive analog inputs. By training the ANN with injected noise, the SNN may be relatively robust with respect to the noise after conversion. For example, by adding Gaussian noise with a standard deviation σ=10 to each artificial neuron of the ANN, the performance of spiking networks may improve after conversion. In addition, while training the ANN, the Gaussian noise may be injected to the activations of the ANN.

Referring again to FIG. 2, outputs of the artificial neurons will be described. The artificial neurons included in the input layer 210 of the ANN may be activated in response to a reception of an analog input. For example, the artificial neurons may have output values of 0.3 according to a ReLU activation function. In this example, a predetermined bias b may be applied to the artificial neurons.

The firing rate of the SNN may be set to correspond to the activations of the ANN. The firing rate may be set to fire spikes proportionally with respect to the activations. For example, in view of the activation output values of 0.3, three spikes may be generated during a predetermined time T by the artificial neurons included in the input layer 220.

Figure 3:
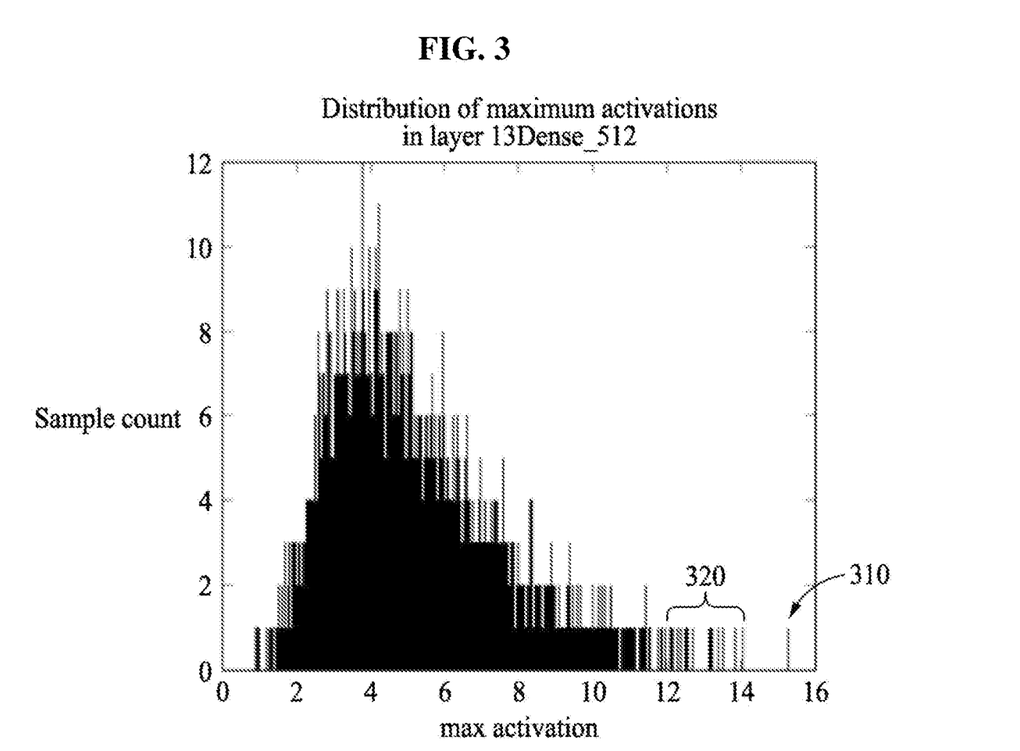
FIG. 3 illustrates a process of normalizing a first parameter of an ANN, according to an exemplary embodiment.

FIG. 3 illustrates a process of normalizing a first parameter of an ANN, according to an exemplary embodiment.

<Robust Normalization>

When an SNN is simulated by using discrete time steps, a firing rate of an artificial neuron may be limited by an inverse time resolution $r_{max}=1/dt$. An ANN does not have such a constraint, and thus first parameters of the ANN need to be scaled, for example, normalized, in order to prevent saturation. Further, a firing rate in the SNN should not be reduced excessively, in order to emit sufficient spikes in subsequent layers. Normalization may not need to be performed with respect to layers without parameters, such as pooling layers or flattening layers.

As described above, a relation between the firing rate r of the SNN and the activation a in the corresponding ANN may be derived. This relation may be given by $r=\alpha \cdot r_{max}$ up to an approximation error term. From this, a normalization scheme may be derived based on a linearity of a ReLU activation function that scales a weight and a bias of each artificial neuron to satisfy $\alpha \leq 1$. To preserve information encoded within a layer, parameters of a layer may need to be scaled jointly.

1. Normalize an input signal $x=a^0:\tilde{a}^0=a^0/\lambda^0$, with $\lambda^0=\max[a^0]$
2. For all layers $l \in [1, \ldots, L]$
   (a) Calculate ANN activations $a^l=f(\lambda^{l-1}W^l\tilde{a}^{l-1}+b^l)$ of a layer l. Here, $f(\chi)=\max[0,\chi]$ is a ReLU activation function. λ denotes a normalization factor, which will be described further below.
   (b) Normalize parameters $[\tilde{W}^l,\tilde{b}^l] \leftarrow [W^l\lambda^{l-1}/\lambda^l, b^l/\lambda^l]$
   (c) Replace old parameters $[W^l,b^l] \leftarrow [\tilde{W}^l,\tilde{b}^l]$ By implementing the above-described method, all activations in the ANN may be less than one (i.e., "1"), and the first parameters may be scaled as expressed by $\tilde{a}^l=a^l/\lambda^l=f(\lambda^{l-1}/\lambda^l W^l\tilde{a}^{l-1}+b^l/\lambda^l])=f(\overline{W}_l a^{l-1}+\overline{b}^l])$. Such a normalization scheme may prevent saturation of artificial neurons of the SNN after conversion.

The normalization factor may be set to a p-th percentile of a total activity distribution, rather than being set to a maximum activation of the ANN. This may remove extreme outliers, and prevent a great decrease in the firing rate of the SNN. Hereinafter, the percentile p will be referred to as a "normalization scale". For example, the percentile p may have a value in the range [99.0, 99.9999].

A robust weight normalization mechanism may be based on a simple change in calculation with respect to the normalization factor. The normalization factor may be selected as a p-th percentile of all activations of the ANN, rather than being set as the maximum activation. For example, the percentile p may include, in general, a great value, for example, a 99.9-th percentile. Extreme outliers may be excluded by the robust weight normalization mechanism, and the firing rate of the SNN may be maintained appropriately.

Referring to FIG. 3, an example of a histogram with respect to the artificial neurons of the ANN is illustrated. An axis x indicates a number of activations during a predetermined time, and an axis y indicates a number of artificial neurons activated as the corresponding number indicated on axis x. In the histogram, artificial neurons activated three to five times occupy a greatest proportion, and an outlier 310 exists on a right side of the histogram. Thus, rather than performing a parameter normalization based on the outlier 310 of the maximum activation, performing a parameter normalization based on artificial neurons 320 of a reference activation that is relatively proximate with respect to the maximum activation may be more effective.

<Layer-Wise Normalization>

A different normalization scale p=p(l) may be set for each layer included in the ANN. For example, a first layer may be normalized by using a high percentile value, for example, p(0)=100, and a second layer may be normalized by using a percentile value which is lower than the percentile value of the first layer. In particular, the normalization scale may be set by p(l)=p(0)−k·l, or p(l)=p(0)(1−k)$^l$.

<Online Normalization>

A maximum firing rate rmax in each layer may be monitored during inference. Firing rates of artificial neurons are to be less than a maximum firing rate $r_{lim}=1/dt$ by a margin ρ. In this example, weights may increase by a common factor. The weights may not need to be retrained, and may be just rescaled during inference.

<Batch-Normalization>

In an example, a batch-normalization (BN) may be applied. The BN may be implemented as a scheme of reducing an internal covariate shift in an ANN. During training, a distribution of input signals of each layer may change as parameters of previous layers are updated. Parameters need to be readjusted to compensate for the distribution of the input signals of each layer. The readjustment of the parameters may reduce the internal covariate shift, and improve the speed and the recognition rate of a training process.

In this aspect, the first parameters of the ANN that are readjusted via the BN may be reflected in the SNN. In particular, the BN may be applied to the first parameters via training of the ANN, and second parameters of the SNN may be determined based on the first parameters. The reduced internal covariate shift may improve the robustness and the recognition accuracy of the SNN.

The BN may be performed by applying an affine transformation to activations of artificial neurons included in each layer.

$$\tilde{x} = \frac{x - \mu}{\sigma} \qquad \text{[Equation 20]}$$

As expressed by Equation 20, by subtracting an average μ from an input signal x and normalizing a variance $\sigma^2$, an activation of each cell in the layer may be whitened. The average and the variance may be calculated over each mini-batch. In a case of convolutional layers, the average and the variance may be calculated over each feature. In addition to the average and the variance, two parameters β and γ may be learned during training, and another affine transformation may be performed.

$$BN[x] = \gamma \tilde{x} + \beta = \frac{\gamma}{\sigma}(x - \mu) + \beta \qquad \text{[Equation 21]}$$

By applying Equation 21, an advantage that an identity transform is restored, and an output of a layer may be brought into an interval suitable for non-linearity may be expected.

A BN layer subsequent to a fully-connected layer l of N neurons or a convolutional layer l of N feature maps may include four parameters $\gamma_i^l$, $\beta_i^l$, $\mu_i^l$, and $\sigma_i^l$, each of a length N. After training, these four parameters may be frozen, and maintained to be constant during an inference time. To store a calculation result and simplify a network architecture, the four parameters may be set as parameters of a layer previous to the BN layer. BN layers may be mainly inserted between convolutional layers or fully-connected layers and activation functions thereof. A weight $\tilde{W}_{ij}^l$ and a bias $\tilde{b}_i^l$ modified by BN may be used to express $z_i^l = \Sigma_{j=1}^M W_i^l \chi_j^{l-1} + b_i^l$.

$$\begin{aligned} BN[z_i^l] &= \frac{\gamma_i^l}{\sigma_i^l}(z_i^l - \mu_i^l) + \beta_i^l \qquad \text{[Equation 22]} \\ &= \frac{\gamma_i^l}{\sigma_i^l}\left(\sum_{j=1}^M W_{ij}^l x_j^{l-1} + b_i^l - \mu_i^l\right) + \beta_i^l \\ &= \sum_{j=1}^M \tilde{W}_{ij}^l x_j^{l-1} + \tilde{b}_i^l \end{aligned}$$

In Equation 22, $$\tilde{W}_{ij}^l = \frac{\gamma_i^l}{\sigma_i^l} W_{ij}^l \quad \tilde{b}_i^l = \frac{\gamma_i^l}{\sigma_i^l}(b_i^l - \mu_i^l) + \beta_i^l$$

may be established.

A BN process may be used to effectively perform an affine transformation of setting an average of activations of the ANN to "0" and setting a standard deviation thereof to "1", thereby removing a covariate shift in deep networks and enabling an output distribution of each layer to be identical.

A mechanism of integrating BN layers into a deep SNN may be performed via an affine transformation in BN by scaling and shifting weights and biases of layers.

Figure 4:
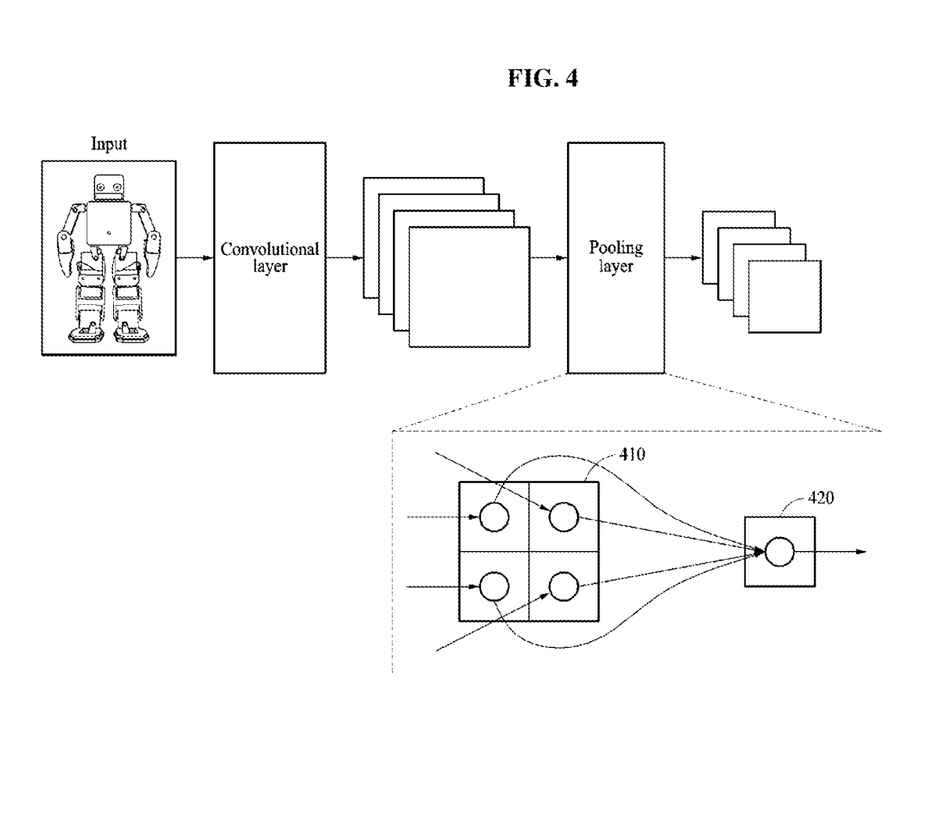
FIG. 4 is a diagram illustrating an operation of a pooling layer included in an SNN, according to an exemplary embodiment.

FIG. 4 is a diagram illustrating an operation of a pooling layer included in an SNN, according to an exemplary embodiment.

Max-pooling may be used to process a maximum activation in a small window within a feature map when an ANN subsamples result values from convolutional layers.

In an SNN, max-pooling may be implemented by using a gating function which transfers only spikes from maximally firing artificial neurons and ignores spikes from other neurons. Thus, the gating function may predict a portion of firing rates of pre-synaptic neurons by calculating an online or exponentially weighted average.

Max-pooling may receive output values from a previous layer, and pass only a maximum value of the received output values to a subsequent layer.

By implementing a max-pooling layer in the SNN, a relatively superior class of a CNN may be converted, and a relatively high accuracy may be expected when compared to a neural network that is obtained by using average pooling. Such a max-pooling layer may be implemented by firing rate estimation and a spike gating mechanism.

The firing rate estimation may locally determine firing rates of artificial neurons by calculating a trace that increases at a time of an input spike and decrease exponentially over time. Further, the firing rates may be estimated by any one or more of a) counting spikes received within a predetermined time window, b) counting accumulated received spikes, or c) measuring a time interval between the received spikes.

The spike gating mechanism may interpret the estimated firing rates, and pass only spikes from artificial neurons having a highest firing rate to a subsequent layer.

Referring to FIG. 4, an example to describe an operation of a pooling layer 420 is illustrated. The pooling layer 420 may transmit, to a layer subsequent to the pooling layer 420, only a spike received from an artificial neuron having a greatest firing rate among a plurality of artificial neurons included in a previous layer 410. For example, the pooling layer 420 may estimate firing rates of the plurality of artificial neurons included in the previous layer 410. The pooling layer 420 may identify the artificial neuron having the greatest firing rate from among the plurality of artificial neurons, and transmit only a spike received from the identified artificial neuron to the subsequent layer. The pooling layer 420 may ignore spikes received from the remaining artificial neurons.

Figure 5:
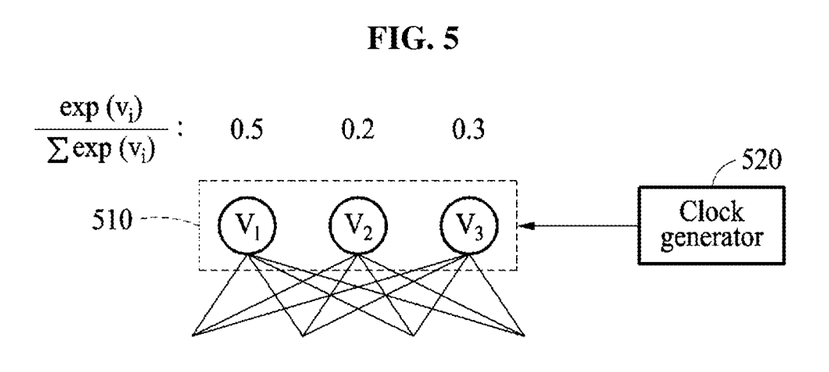
FIG. 5 is a diagram illustrating an operation of an output layer included in an SNN, according to an exemplary embodiment.

FIG. 5 is a diagram illustrating an operation of an output layer included in an SNN, according to an exemplary embodiment.

An output layer may be implemented mainly by a softmax activation function as expressed by Equation 23.

$$\sigma(X)_i = \frac{e^{x_i}}{\sum_k^K e^{x_k}}, \text{ for } i = 1, \ldots, K \quad \text{[Equation 23]}$$

According to Equation 23, a value of an artificial neuron in an output layer may be changed in the range of [0, 1], and a sum of artificial neurons may be equal to one (i.e., "1"). An output of a softmax layer using the softmax activation function may be interpreted as predicted probabilities with respect to K classes.

A class in the SNN may be simply defined as an index of an artificial neuron that spikes while a stimulus exists. However, when all artificial neurons of the last output layer receive negative inputs and do not spike, this approach may fail.

Thus, in an output layer included in the SNN, thresholds set for artificial neurons may be removed, and thus there may be no artificial neuron that spikes by itself. The artificial neurons may simply accumulate inputs. Instead, a spike of an output layer may be triggered by an external Poisson-clock with a parameter $\mu$. The parameter $\mu$ is a Poisson-clock rate, and may be set to a value between zero (i.e., "0") and a maximum firing rate, for example, an inverse time resolution $1/dt$.

Although the Poisson-clock triggers a spike in the output layer, an artificial neuron that is configured to output the spike in the output layer may need to be determined. This may be performed by calculating a softmax function with respect to membrane potentials of artificial neurons of the output layer. An artificial neuron with a highest softmax probability may be determined to fire a spike. A final classification result in the stimulus presentation course may be given as an index of the artificial neuron with the highest firing rate.

By implementing a softmax layer as the output layer in the SNN, an accuracy of the SNN converted from the ANN may improve greatly. In this aspect, a difference between the accuracy of the ANN and the accuracy of the SNN may decrease considerably.

A softmax layer may be typically used in an output layer of a deep neural network or used when a value needs to be normalized. The softmax layer may calculate an exponential $\exp(\beta \cdot x_i)$ and an arbitrary constant $\beta$ with respect to inputs $x_1, \ldots, x_k$ for a corresponding layer, and normalize the inputs $x_1, \ldots, x_k$ by summing up all exponential transformations. In particular, the transformed inputs may all have positive values although there is a negative input, and a sum thereof may be set to be equal to one (i.e., "1").

The softmax layer may calculate membrane potentials of all artificial neurons included in the softmax layer when an event is received from the Poisson-clock. The softmax layer may determine an artificial neuron as being configured to generate a spike based on softmax values obtained by applying a softmax function to membrane potentials of artificial neurons. In particular, the softmax layer may determine an artificial neuron having a greatest softmax value to generate the spike.

Referring to FIG. 5, an output layer 510 of an SNN and a clock generator 520 are illustrated. The output layer 510 may output a spike when a clock is received from the clock generator 520. When the clock is received, the output layer 510 may obtain membrane potentials of internal artificial neurons, and apply a softmax function to the obtained membrane potentials. The output layer 510 may identify an artificial neuron having a greatest value among values to which the softmax function is applied, and output a spike via the corresponding artificial neuron. The output layer 510 may determine an artificial neuron to output the spike with a rate of the value to which the softmax function is applied, and may then output the spike via the determined artificial neuron.

Figure 6:
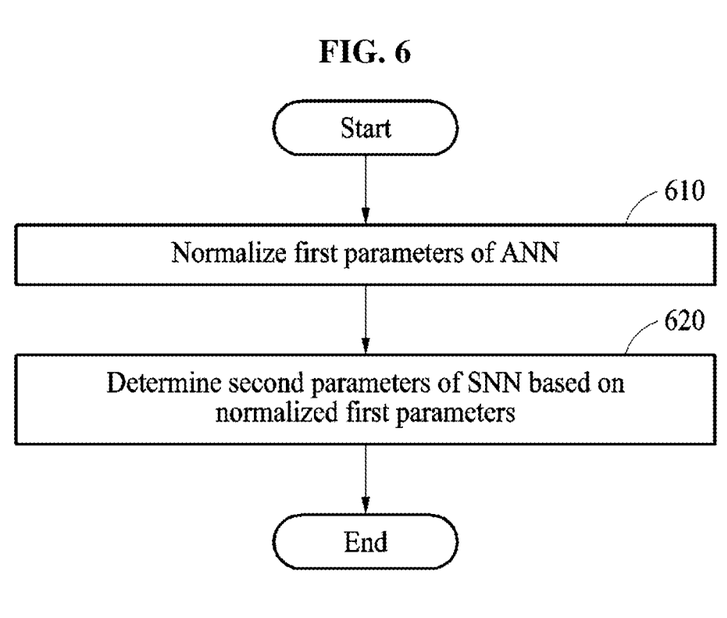
FIG. 6 is a flowchart illustrating a method of converting an ANN to an SNN, according to an exemplary embodiment.

FIG. 6 is a flowchart illustrating a method of converting an ANN to an SNN, according to an exemplary embodiment.

Referring to FIG. 6, a method of converting an ANN to an SNN performed by a processor included in a conversion apparatus is illustrated.

In operation 610, the conversion apparatus may normalize first parameters of a trained ANN by using a reference activation that is set to be proximate (i.e., determined based on a predetermined proximity) with respect to a maximum activation of artificial neurons included in the ANN.

The conversion apparatus may set an activation to be proximate to a one-hundredth (i.e., 100-th) percentile from among activations of the artificial neurons included in the ANN as the reference activation, and normalize the first parameters based on the reference activation.

Further, the conversion apparatus may determine a reference activation that corresponds to a first layer included in the ANN, and normalize first parameters that correspond to the first layer based on the determined reference activation. In this example, the reference activation that corresponds to the first layer may be set to be more proximate to the maximum activation than a reference activation that corresponds to a second layer subsequent to the first layer.

In addition, the conversion apparatus may normalize first parameters that correspond to a particular layer included in the ANN based on an average and a variance of an input signal input into the particular layer such that the input signal is normalized.

In operation 620, the conversion apparatus may determine second parameters of an SNN based on the normalized first parameters. The conversion apparatus may determine the corresponding second parameters based on the normalized first parameters by comparing a structure of the ANN with a structure of the SNN.

A current membrane potential of an artificial neuron included in the SNN may be determined based on any one or more of a previous membrane potential of the artificial neuron, a reception signal received through an input synapse of the artificial neuron, and a predetermined bias.

Further, an output layer included in the SNN may determine an artificial neuron to be configured to output a spike based on current membrane potentials of artificial neurons included in the output layer obtained at a predetermined timing, and then output the spike via the determined artificial neuron. In this example, the output layer may calculate a result value obtained by applying a softmax function to the current membrane potentials of the artificial neurons, and determine an artificial neuron having a greatest value as being configured to output the spike. A threshold to output a spike may not be set for the artificial neurons included in the output layer.

A pooling layer included in the SNN may transmit, to a layer subsequent to the pooling layer, a spike received from an artificial neuron having a greatest firing rate from among a plurality of artificial neurons included in a layer previous to the pooling layer. In this aspect, the firing rate may be determined by performing any one or more of estimating a membrane potential of the corresponding artificial neuron that increases when a reception signal is received via an input synapse and decreases exponentially over time, counting spikes output from the corresponding artificial neuron within a predetermined time window, counting accumulated spikes output from the corresponding artificial neuron, and/or measuring a time interval between spikes output from the corresponding artificial neuron.

A current membrane potential of an artificial neuron included in the SNN may decrease by a predetermined threshold when a spike is output from the artificial neuron as the current membrane potential exceeds the predetermined threshold.

An input layer included in the SNN may determine membrane potentials of artificial neurons included in the input layer from analog input data to be recognized by using the SNN, determine whether a new spike is generated and an artificial neuron to be configured to output the new spike based on the determined membrane potentials and a predetermined threshold, and then output the new spike via the determined artificial neuron.

In this aspect, the first parameters may include weights assigned to synapses of a plurality of neurons that belong to the layer and biases applied to the plurality of neurons. Further, the firing rate may be determined based on a number of spikes output from the corresponding artificial neuron during a predetermined time.

The description provided above with reference to FIGS. 1, 2, 3, 4, and 5 may apply to the operations of FIG. 6, and thus duplicated descriptions will be omitted for conciseness.

Figure 7:
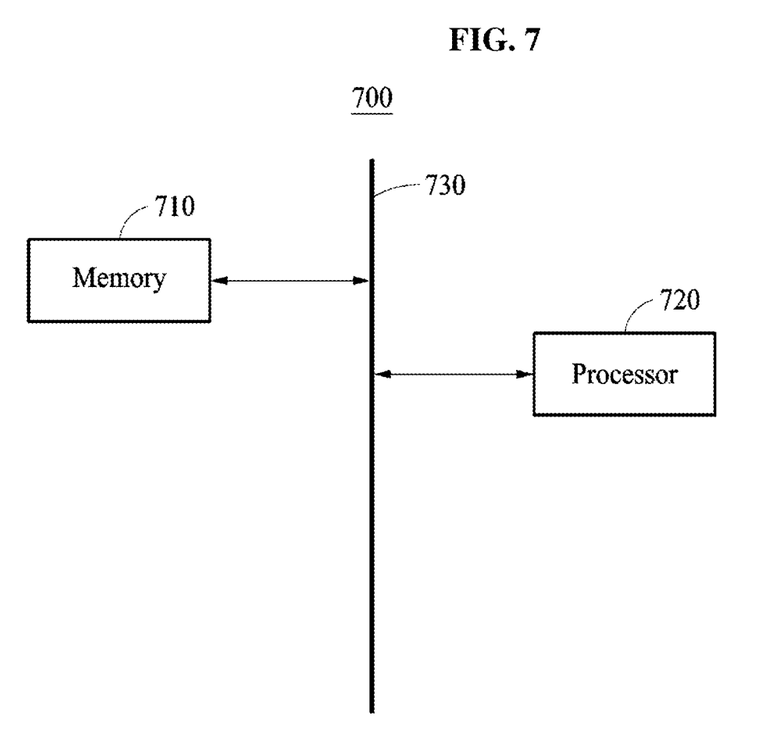
FIG. 7 is a block diagram illustrating a recognition apparatus, according to an exemplary embodiment.

FIG. 7 is a block diagram illustrating a recognition apparatus, according to an exemplary embodiment.

Referring to FIG. 7, a recognition apparatus 700 may include a memory 710 and a processor 720. The memory 710 and the processor 720 may exchange data via a bus 730.

The memory 710 may include a volatile memory and a non-volatile memory, and store information received via the bus 730. The memory 710 may include at least one instruction that is executable by the processor 720. Further, the memory 710 may store an SNN that is configured to recognize input data. Each SNN may be stored in the memory 710 in a form of an executable object file or execution file. In addition, second parameters for each SNN may be stored in the memory 710.

The processor 720 may execute the at least one instruction stored in the memory 710. The processor 720 may recognize the input data by using the SNN.

In this aspect, the SNN may include second parameters which are determined based on first parameters of a trained ANN. In this example, the first parameters may be normalized based on a reference activation that set to be proximate to a maximum activation of artificial neurons included in the ANN, and the normalized first parameters may be used to determine the second parameters.

An output layer included in the SNN may determine an artificial neuron to be configured to output a spike based on current membrane potentials of artificial neurons included in the output layer obtained at a predetermined timing to output the spike, and then output the spike via the determined artificial neuron.

The description provided with reference to FIGS. 1, 2, 3, 4, 5, and 6 may apply to the constituents of FIG. 7, and thus duplicated descriptions will be omitted for conciseness.

The above-described exemplary embodiments may be recorded in non-transitory computer-readable media that include program instructions to implement various operations which may be performed by a computer. The media may also include, alone or in combination with the program instructions, data files, data structures, and the like. The program instructions recorded on the media may be those specially designed and constructed for the purposes of the exemplary embodiments, or they may be of the well-known kind and available to those having skill in the computer software arts. Examples of non-transitory computer-readable media include magnetic media such as hard disks, floppy disks, and magnetic tape; optical media such as compact disc-read-only memory (CD ROM) discs and digital versatile discs (DVDs); magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described exemplary embodiments, or vice versa.

The foregoing exemplary embodiments are examples and are not to be construed as limiting. The present disclosure can be readily applied to other types of apparatuses. Also, the description of the exemplary embodiments is intended to be illustrative, and not to limit the scope of the claims, and many alternatives, modifications, and variations will be apparent to those having ordinary skill in the art.

What is claimed is:

1. A method for converting an analog neural network (ANN) to a spiking neural network (SNN), the method comprising:
   normalizing first parameters of the ANN based on a reference activation which is determined based on a predetermined proximity with respect to a maximum activation of artificial neurons included in the ANN; and
   determining second parameters of an SNN based on the normalized first parameters,
   wherein the normalizing comprises setting an activation based on a predetermined proximity with respect to a one-hundredth percentile from among activations of the artificial neurons included in the ANN as the reference activation, and normalizing the first parameters based on the reference activation.

2. The method of claim 1, wherein the normalizing comprises determining a reference activation that corresponds to a first layer included in the ANN, and normalizing first parameters that correspond to the first layer based on the determined reference activation, and
   wherein the reference activation that corresponds to the first layer is set to be more proximate to the maximum activation than a reference activation that corresponds to a second layer that is subsequent to the first layer.

3. The method of claim 1, wherein a current membrane potential of an artificial neuron included in the SNN is determined based on at least one from among a previous membrane potential of the artificial neuron, a reception signal received via an input synapse of the artificial neuron, and a predetermined bias.

4. The method of claim 1, further comprising determining, by an output layer included in the SNN, an artificial neuron to be used for outputting a spike based on current membrane potentials of artificial neurons included in the output layer obtained at a predetermined timing, and outputting the spike via the determined artificial neuron.

5. The method of claim 4, wherein a threshold that relates to outputting a spike is not set for the artificial neurons included in the output layer.

6. The method of claim 1, further comprising transmitting, by a pooling layer included in the SNN, to a layer subsequent to the pooling layer, a spike received from an artificial neuron having a greatest firing rate from among a plurality of artificial neurons included in a layer previous to the pooling layer.

7. The method of claim 6, wherein for each respective artificial neuron, a corresponding firing rate is determined by performing at least one from among estimating a membrane potential of a corresponding artificial neuron that increases when a reception signal is received via an input synapse and decreases exponentially over time, counting spikes output from the corresponding artificial neuron within a predetermined time window, counting accumulated spikes output from the corresponding artificial neuron, and measuring a time interval between spikes output from the corresponding artificial neuron.

8. The method of claim 1, wherein a current membrane potential of an artificial neuron included in the SNN decreases by a predetermined threshold when a spike is output from the artificial neuron as the current membrane potential exceeds the predetermined threshold.

9. The method of claim 1, wherein the normalizing comprises normalizing the first parameters that correspond to a first layer included in the ANN based on an average and a variance of an input signal input into the first layer such that the input signal is normalized.

10. The method of claim 1, further comprising determining, by an input layer included in the SNN, membrane potentials of artificial neurons included in the input layer from analog input data to be recognized by using the SNN, determining, by the input layer, whether a new spike is generated and an artificial neuron to be used for outputting the new spike based on the determined membrane potentials and a predetermined threshold, and outputting, by the input layer, the new spike via the determined artificial neuron.

11. The method of claim 1, wherein the first parameters comprise weights assigned to synapses of a plurality of neurons that belong to the ANN and biases applied to the plurality of neurons.

12. A non-transitory computer-readable storage medium storing a program executable by a computer for performing the method of claim 1.

13. A recognition apparatus, comprising:
    a processor configured to recognize input data by using a spiking neural network (SNN); and
    a memory including at least one instruction that is executable by the processor,
    wherein an output layer included in the SNN is configured to determine an artificial neuron to be used for outputting a spike based on current membrane potentials of artificial neurons included in the output layer obtained at a predetermined timing, and to output the spike via the determined artificial neuron,
    wherein a threshold that relates to outputting a spike is not set for the artificial neurons included in the output layer.

14. The recognition apparatus of claim 13, wherein a pooling layer included in the SNN is configured to transmit, to a layer subsequent to the pooling layer, a spike received from an artificial neuron having a greatest firing rate from among a plurality of artificial neurons included in a layer previous to the pooling layer.

15. The recognition apparatus of claim 13, wherein the processor is further configured to determine a second parameter of the SNN based on first parameters of a trained analog neural network (ANN) that are normalized based on a reference activation that is determined based on a predetermined proximity with respect to a maximum activation of artificial neurons included in the ANN.

16. The recognition apparatus of claim 13, wherein the processor is further configured to determine a current membrane potential of an artificial neuron included in the SNN based on at least one from among a previous membrane potential of the artificial neuron, a reception signal received through an input synapse of the artificial neuron, and a predetermined bias.

17. The recognition apparatus of claim 13, wherein a current membrane potential of an artificial neuron included in the SNN decreases by a predetermined threshold when a spike is output from the artificial neuron as the current membrane potential exceeds the predetermined threshold.

18. A method for converting an analog neural network (ANN) to a spiking neural network (SNN), the method comprising:
    obtaining, for a plurality of neurons that belong to the ANN, a corresponding plurality of weights assigned to synapses of the plurality of neurons and a corresponding plurality of biases applied to the plurality of neurons;

normalizing the obtained plurality of weights and the obtained plurality of biases based on a predetermined activation based on artificial neurons included in the ANN; and determining, based on the normalized plurality of weights and the normalized plurality of biases, a plurality of firing rates to be used for constructing the SNN, wherein the determining the plurality of firing rates comprises determining, for each respective artificial neuron to be included in the SNN, a corresponding current membrane potential, wherein the determining the corresponding current membrane potential for each respective artificial neuron to be included in the SNN comprises determining a current member potential based on at least one from among a previous membrane potential for the corresponding artificial neuron, a reception signal received via an input synapse of the corresponding artificial neuron, and a predetermined bias, and wherein for each respective artificial neuron to be included in the SNN, a corresponding firing rate determined by performing at least one from among estimating a membrane potential of the corresponding artificial neuron that increases when the reception signal is received via the input synapse and decreases exponentially over time, counting spikes output from the corresponding artificial neuron within a predetermined time window, counting accumulated spikes output corresponding artificial neuron, and measuring a time interval between spikes output from the corresponding artificial neuron.

* * * * *